United States Patent
Mitchell et al.

(10) Patent No.: US 10,229,314 B1
(45) Date of Patent: Mar. 12, 2019

(54) OPTICAL RECEIPT PROCESSING

(71) Applicant: Groupon, Inc., Chicago, IL (US)

(72) Inventors: Stephen Clark Mitchell, Chicago, IL (US); Pavel Melnichuk, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 154 days.

(21) Appl. No.: 15/281,517

(22) Filed: Sep. 30, 2016

Related U.S. Application Data

(60) Provisional application No. 62/235,173, filed on Sep. 30, 2015.

(51) Int. Cl.
| | |
|---|---|
| *G06K 9/34* | (2006.01) |
| *G06K 9/00* | (2006.01) |
| *G06K 9/46* | (2006.01) |
| *G06Q 20/04* | (2012.01) |
| *G06K 9/62* | (2006.01) |

(52) U.S. Cl.
CPC ....... *G06K 9/00442* (2013.01); *G06K 9/4671* (2013.01); *G06Q 20/0453* (2013.01); *G06K 9/6227* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 6,891,633 B1 | 5/2005 | Hayward et al. | |
| 7,522,755 B2 * | 4/2009 | Li | G06T 11/005 128/922 |
| 8,903,136 B1 * | 12/2014 | Wang | G06K 9/00463 382/112 |
| 9,558,426 B2 * | 1/2017 | Song | G06K 9/46 |
| 9,824,270 B1 * | 11/2017 | Mao | G06K 9/00469 |
| 2006/0204076 A1 * | 9/2006 | Avinash | G06T 11/005 382/154 |
| 2009/0018895 A1 * | 1/2009 | Weinblatt | G06Q 30/02 705/7.29 |
| 2011/0262536 A1 * | 10/2011 | Jordan | A61J 3/007 424/464 |
| 2014/0214652 A1 * | 7/2014 | Zheng | G06Q 20/227 705/39 |

(Continued)

OTHER PUBLICATIONS

U.S. Appl. No. 62/235,173, filed Sep. 30, 2015, entitled Optical Receipt Processing, 49 pages total.

*Primary Examiner* — Feng Niu
(74) *Attorney, Agent, or Firm* — Alston & Bird LLP

(57) ABSTRACT

Techniques for providing improved optical character recognition (OCR) for receipts are discussed herein. Some embodiments may provide for a system including one or more servers configured to perform receipt image cleanup, logo identification, and text extraction. The image cleanup may include transforming image data of the receipt by using image parameters values that optimize the logo identification, and performing logo identification using a comparison of the image data with training logos associated with merchants. When a merchant is identified, a second image clean up may be performed by using image parameter values optimized for text extraction. A receipt structure may be used to categorize the extracted text. Improved OCR accuracy is also achieved by applying on format rules of the receipt structure to the extracted text.

20 Claims, 11 Drawing Sheets

(56) References Cited

U.S. PATENT DOCUMENTS

| | | | | |
|---|---|---|---|---|
| 2014/0366052 | A1* | 12/2014 | Ives | H04N 21/23418 |
| | | | | 725/19 |
| 2015/0139506 | A1* | 5/2015 | Wang | G06K 9/00463 |
| | | | | 382/112 |
| 2015/0310306 | A1* | 10/2015 | Song | G06K 9/46 |
| | | | | 382/159 |
| 2017/0091580 | A1* | 3/2017 | Song | G06K 9/46 |

* cited by examiner

1100
PAT LESS:

CHICAGO DIVISION            012-470-8944
07/16/2015            05:58 PM            >A
3

ENTERTAINMENT-ELECTRONICS

059076878       US WEEKLY                        N            $4.99
US WEEKLY US WEEKLY
RETURN BY 08/15/15                  L
4
GROCERY

211140819              BROCCOLI     FB                        $5.88
BROCCOLI         BROCCOLI FLORETS 12 OZ
2 $2.94 ea.
211500086       BULK PRODUC     FB    $5.89
BULK PRODUCE ORGANIC AVOCADO 4 CT
216840014       PANERA SOUP     FB    $4.49
PANERA SOUP LOBSTER BISQUE 16OZ
226111208       BEEF RIBEYE     FB    $18.67
BEEF RIBEYE S&D BNLS RIBEYE STEAK
266080010            PEACH                     FB            $1.58
PEACH           PEACH BY EACH
2 $0.79 ea.
266084054            RASPBERRIES      FB                     $2.79
RASPBERRIES          RASPBERRIES  6            OZ
RASPBERRIES          RASPBERRIES  6           OZ
266084289          BLACKBERRIE         FB                    $2.29
BLACKBERRIES    BLACKBERRIES 6 OZ
267014048            LIME                       FB            $0.98
LIME            LIME BY EACH
2 $0.49 ea.
268020085          LAURAS LEAN          FB                   $18.58
LAURAS LEAN 92%LN 8%FT GRND BF 1LB
2 $6.79 ea.
284000008  NESTLE DOUG FB                                    $2.94
NESTLE DOUGH CHOCCHIP COOKIE 16.5OZ
284028007            DEANS         FB                        $8.89
DEANS              1% MILK GALLON                            $1.44
284090041              DAISYFB
DAISY           LITE SOUR CREAM 8OZ                          $2.44
284110665          MP SHREDDED FB
MP SHREDDED        SHARP CHEDDAR 8OZ

MISC

FIG. 11

OPTICAL RECEIPT PROCESSING

CROSS REFERENCE TO RELATED APPLICATIONS

The present application claims the benefit of priority to U.S. Provisional Application Ser. No. 62/235,173, titled "Optical Receipt Processing," filed Sep. 30, 2015, the contents of which are included by reference herein in their entirety.

FIELD

Embodiments of the invention relate, generally, to techniques for providing messages based on programmatic optical recognition.

BACKGROUND

Optical character recognition (OCR) refers to the conversion of an image including text into machine-encoded text. For example, financial systems use OCR to extract check data from paper checks based on scanning the paper check to generate image data, such as with a camera, and then processing the image to extract text data of the check (e.g., amount, account number, etc.). As such, checks are typically created to facilitate the OCR process. For example, checks use an OCR-A font that is monospaced and simple thick strokes to support machine recognition. Checks also include standardized locations for data fields. The payee and numerical dollar amount are typically on a first line, then the written amount on a subsequent line, then a signature block on a third line, and account numbers at the bottom. Using these standardized locations of check data on the check, each "field" of the check is programmatically extracted and categorized such that the check can be understood and processed. However, not all images are designed to be susceptible to OCR. Receipts of various merchants, for example, may use different fonts and formats such that the conventional techniques used in check processing fail to yield reliable data. In this regard and others as discussed herein, areas for improving current techniques have been identified.

BRIEF SUMMARY

Through applied effort, ingenuity, and innovation, solutions to improve such systems have been realized and are described herein.

Various embodiments of the present invention are directed to improved apparatuses, methods, and computer readable media for Some embodiments may include methods, while other embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
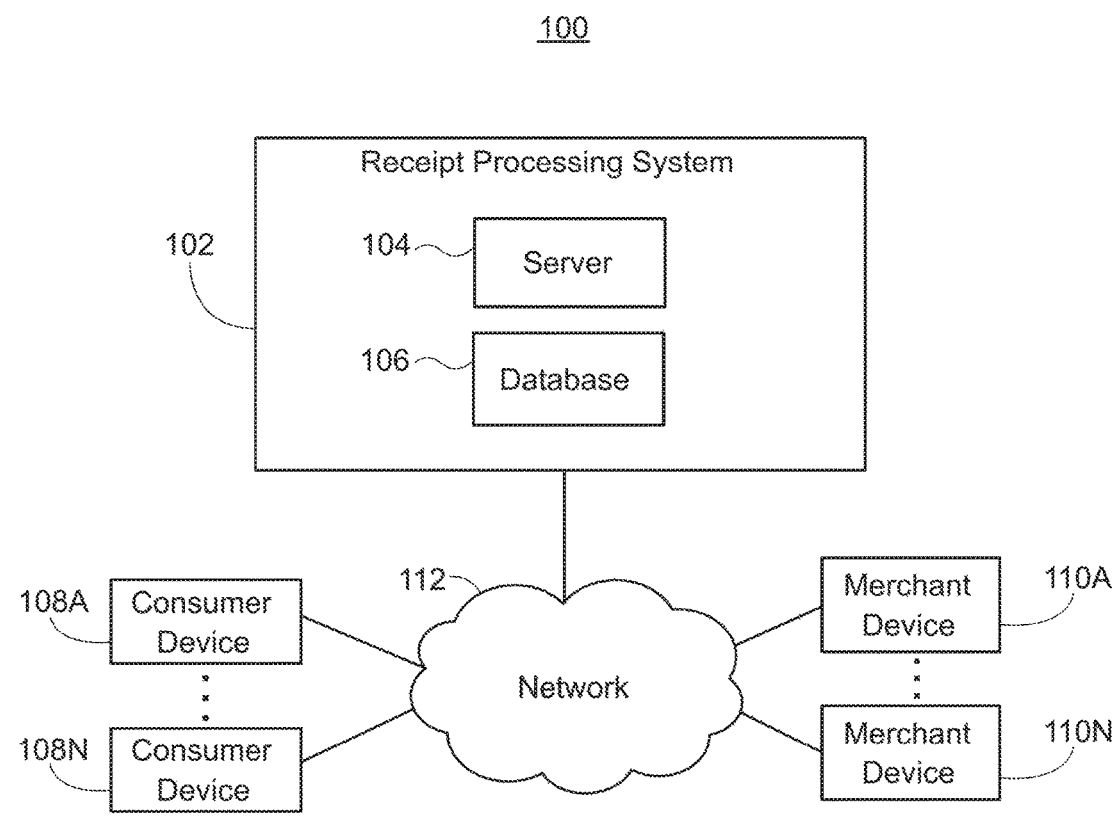
Figure 2:
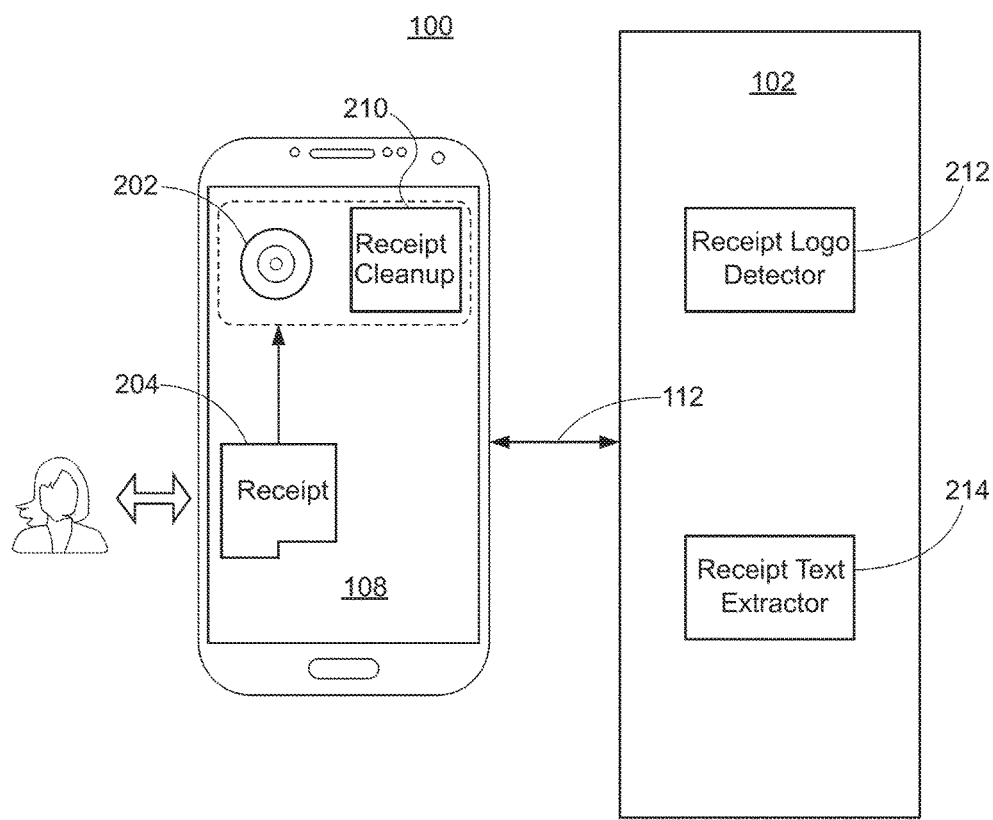
Figure 3:
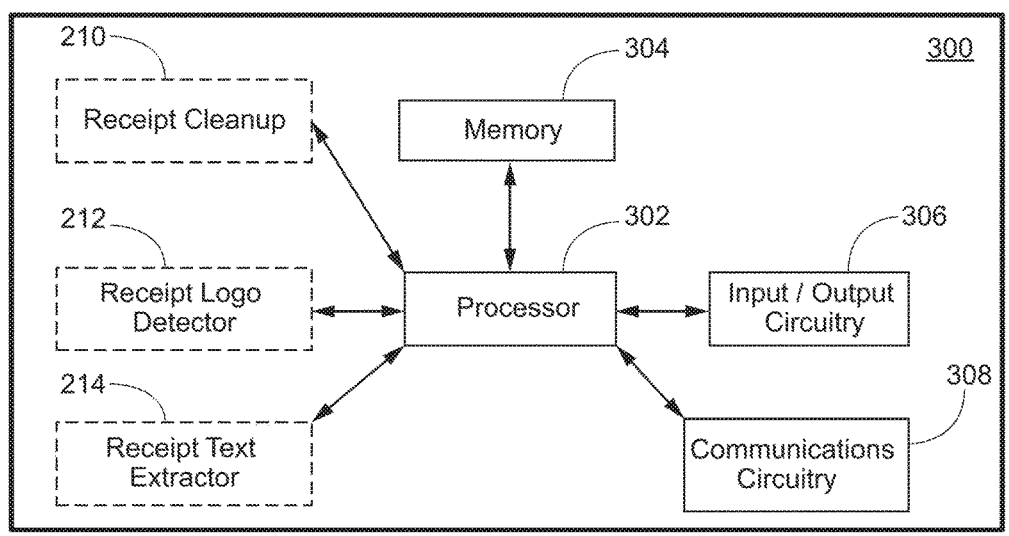
Figure 4:
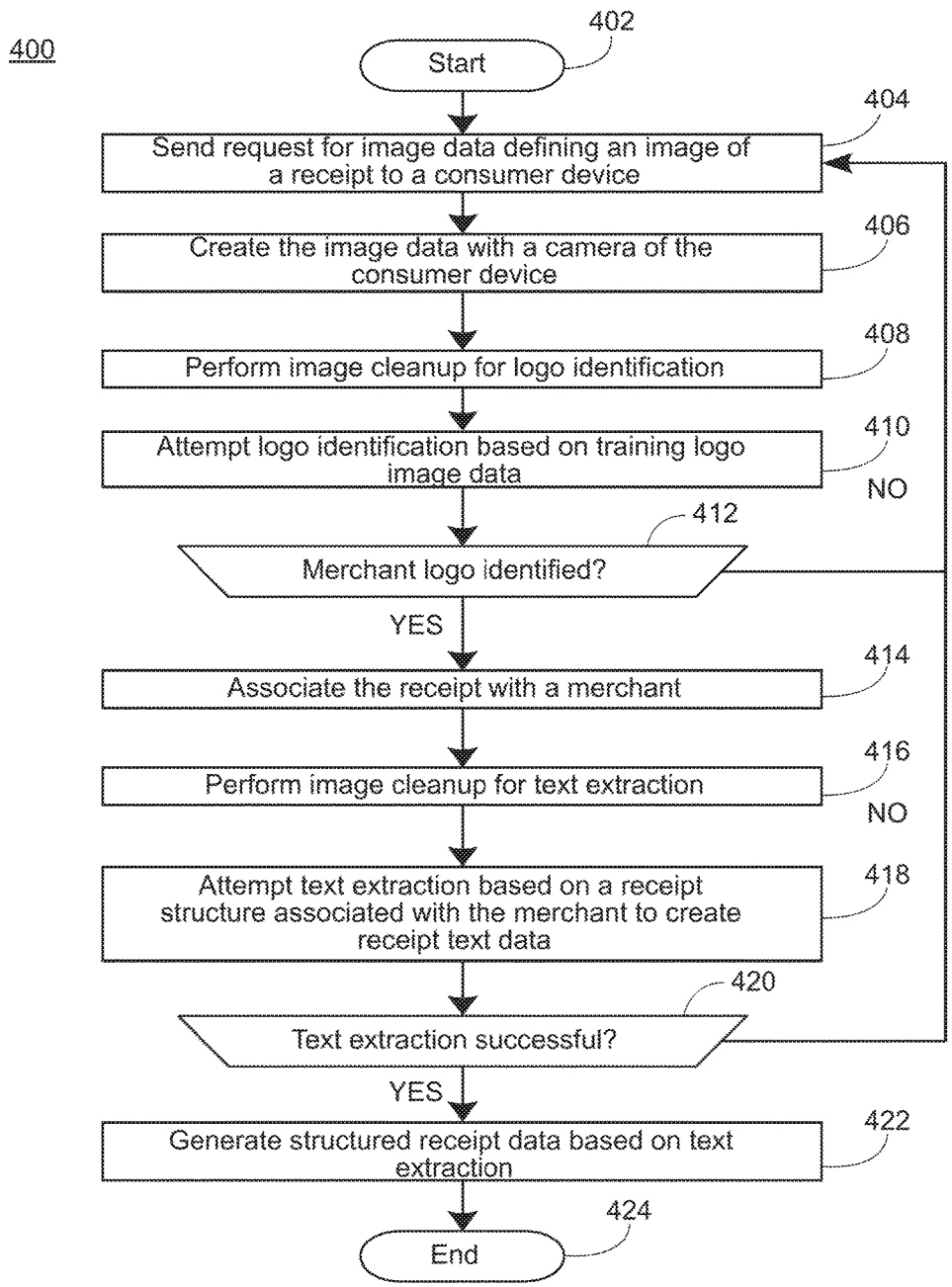

Having thus described some embodiments in general terms, reference will now be made to the accompanying drawings, which are not necessarily drawn to scale, and wherein:

FIG. 1 shows an example of a system in accordance with some embodiments;

FIG. 2 shows an example of a system in accordance with some embodiments;

FIG. 3 shows a schematic block diagram of example circuitry in accordance with some embodiments;

FIG. 4 shows a flow chart of an example of a method for receipt image cleanup in accordance with some embodiments.

Figure 5:
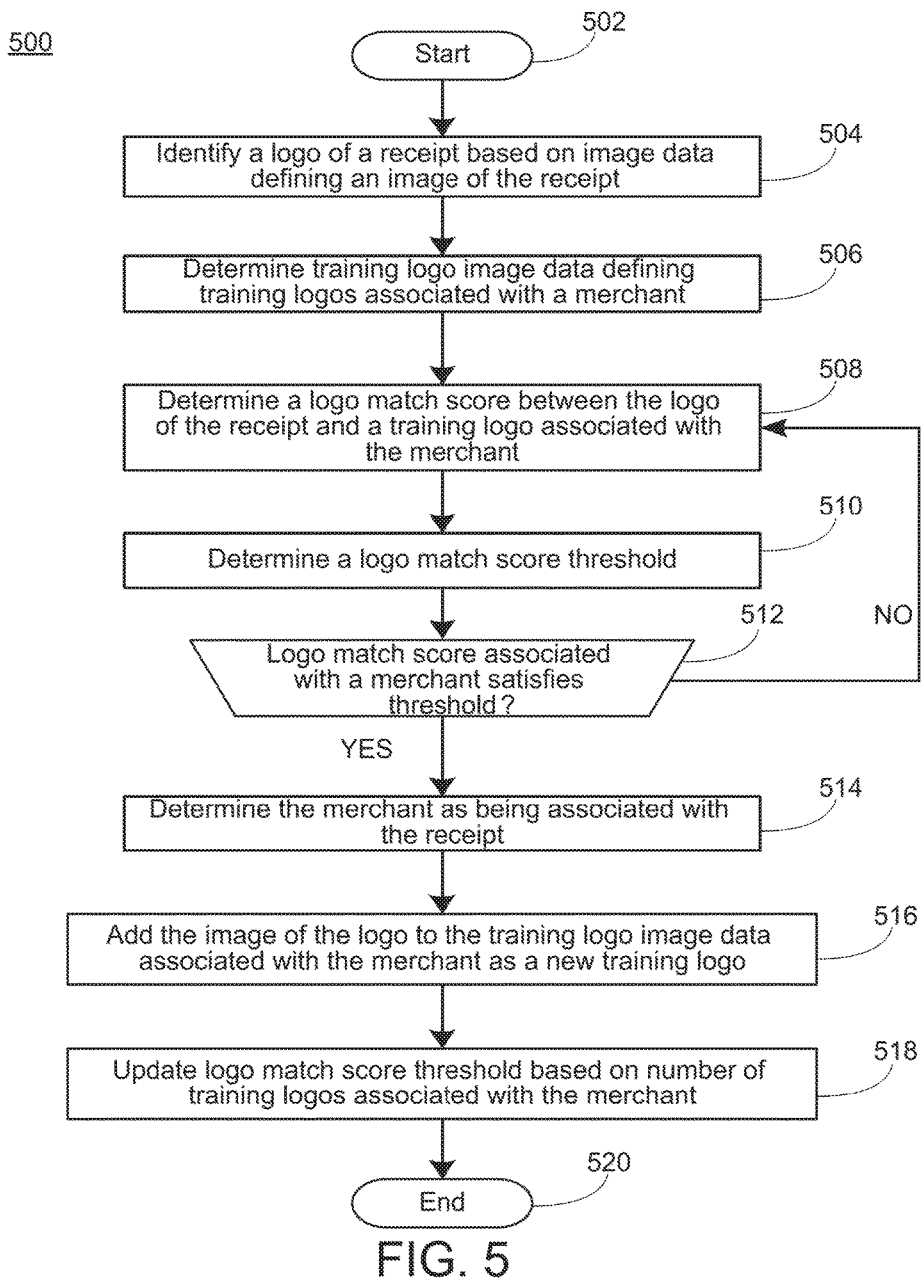
Figure 6:
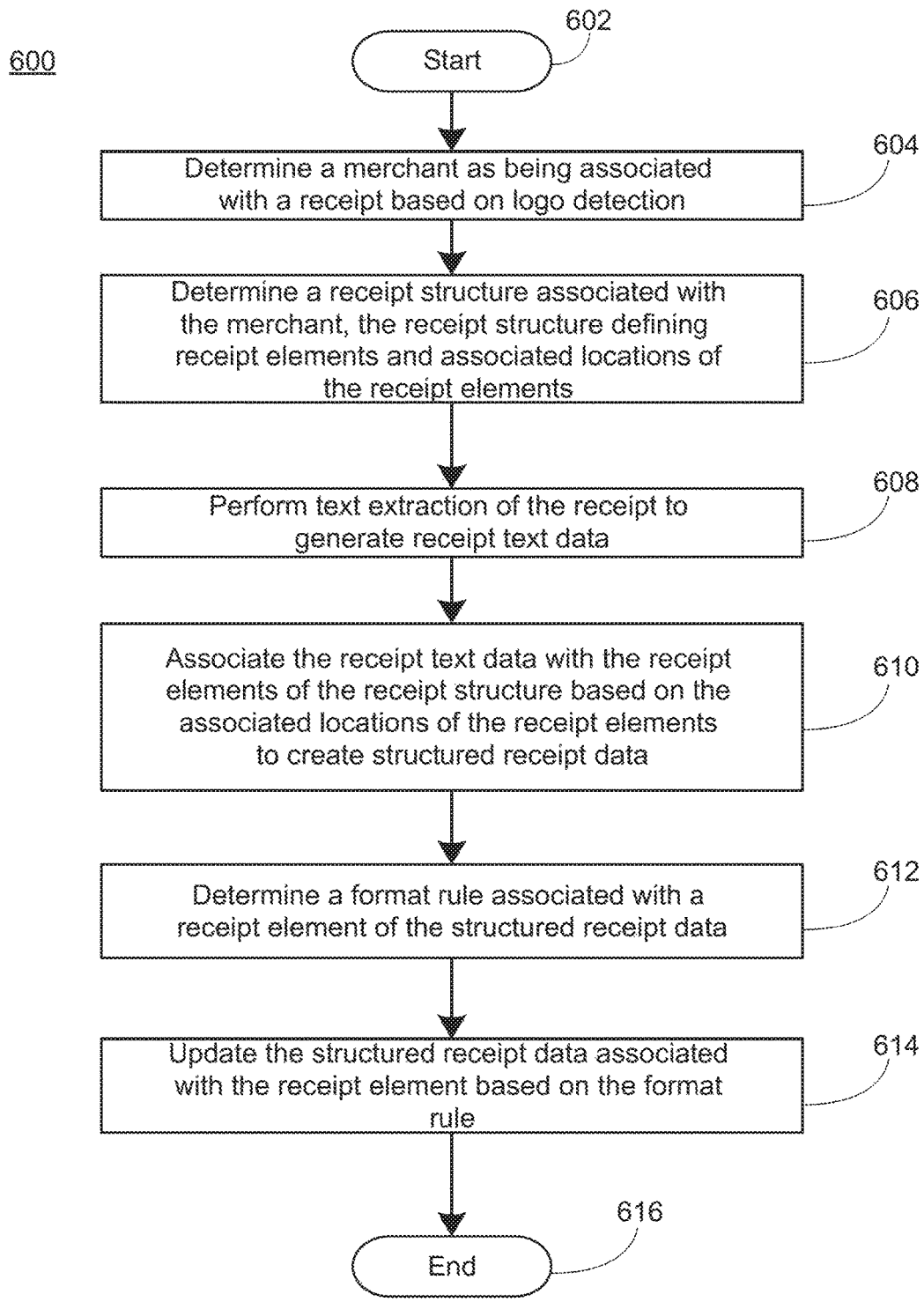
Figure 7:
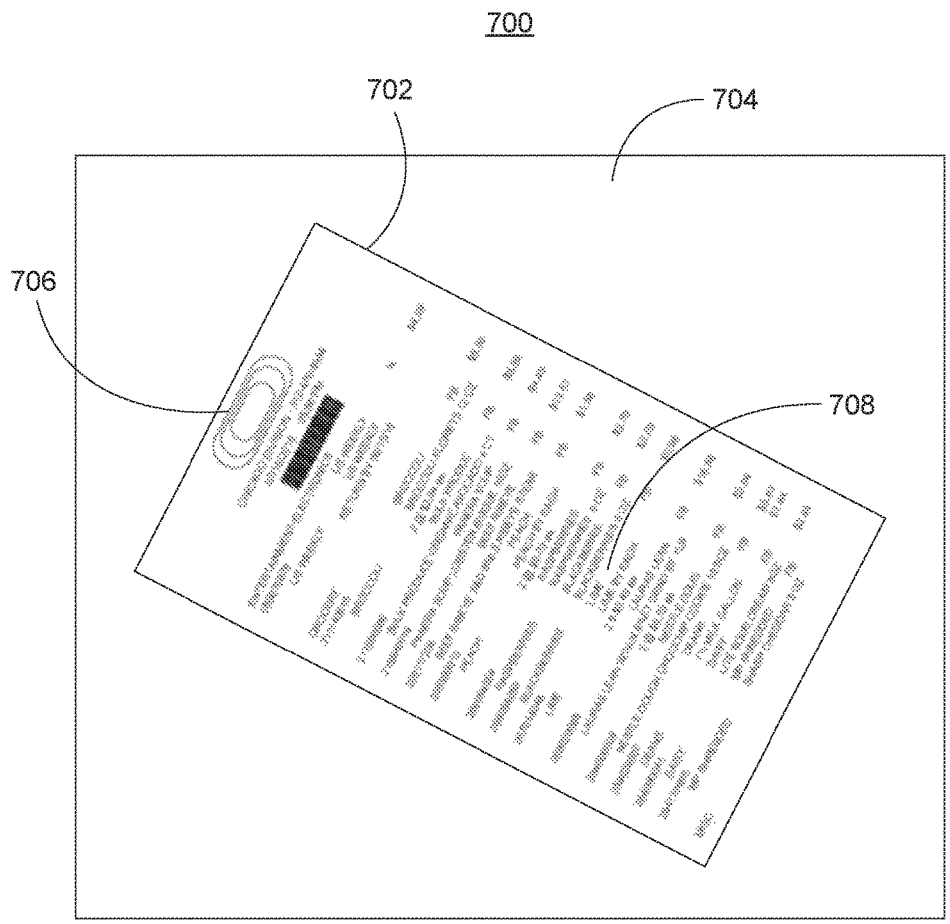
Figure 8:
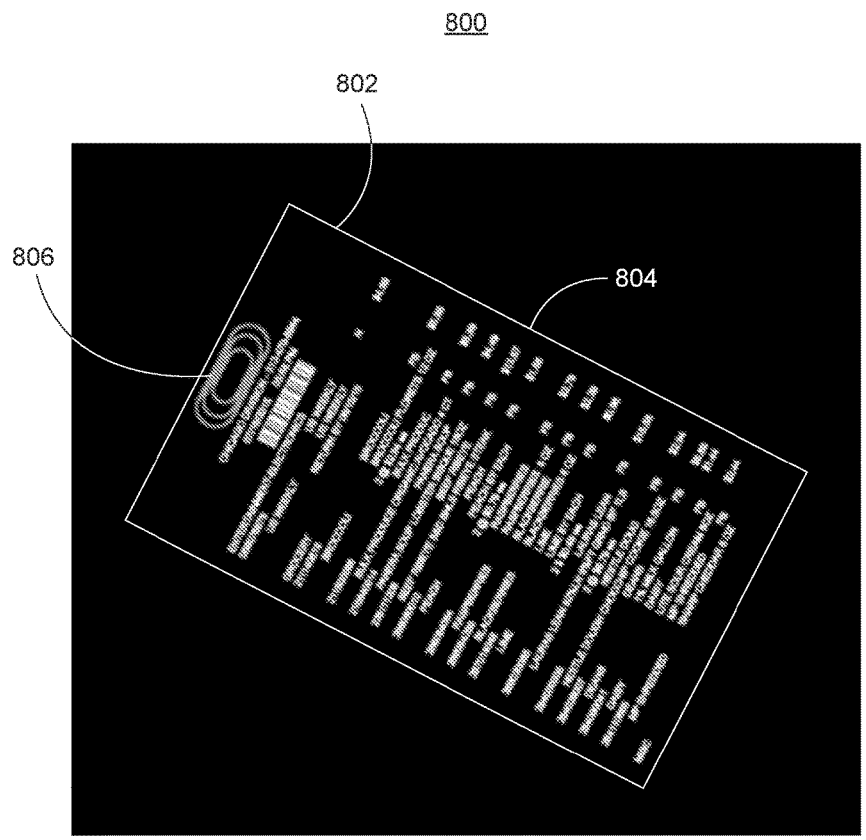
Figure 9:
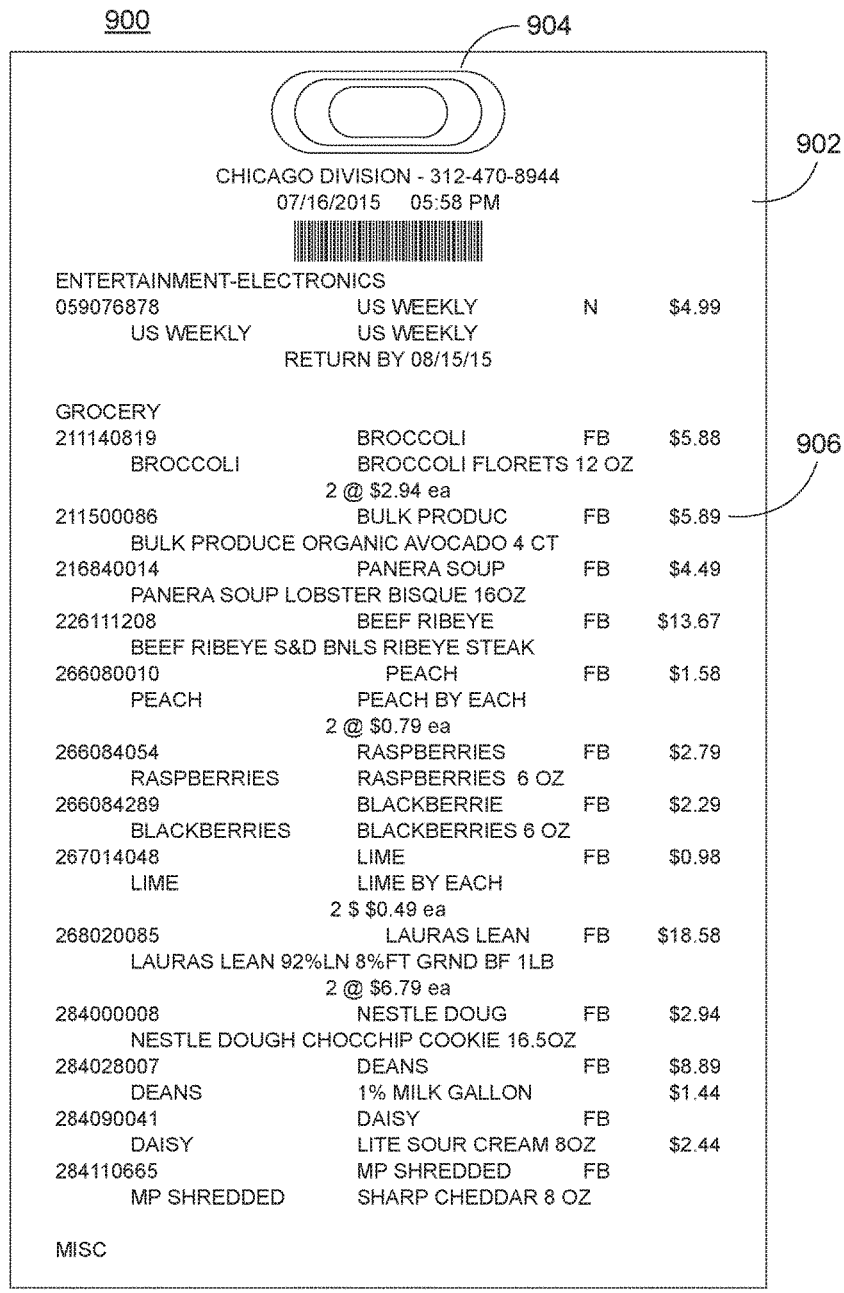
Figure 10:
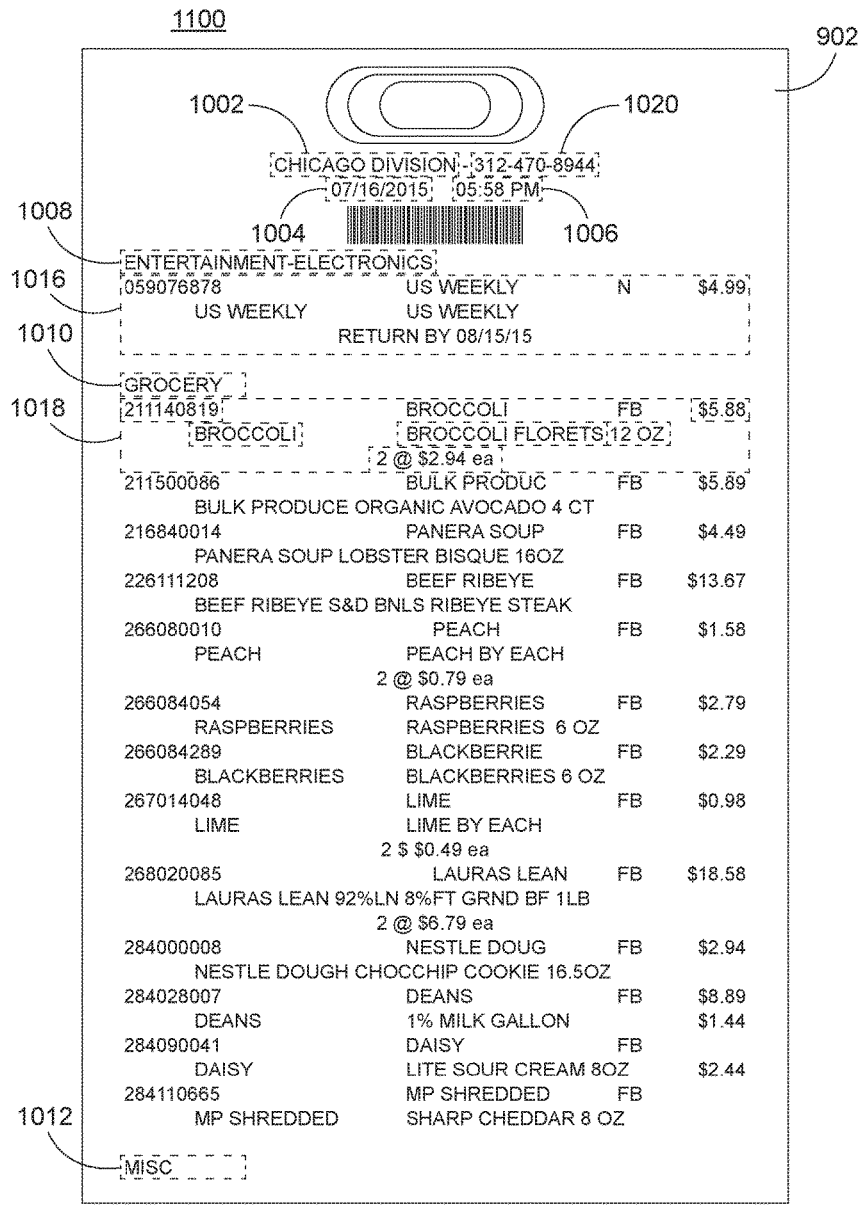

FIG. 5 shows an example of a method for receipt logo detection in accordance with some embodiments;

FIG. 6 shows an example of a method for receipt text extraction in accordance with some embodiments;

FIG. 7 shows an example of image data defining a receipt in accordance with some embodiments;

FIG. 8 shows an example of image data programmatically transformed for receipt detection and/or logo identification in accordance with some embodiments;

FIG. 9 shows an example of image data programmatically transformed for text extraction in accordance with some embodiments;

FIG. 10 shows an example of a receipt structure in accordance with some embodiments; and FIG. 11 shows an example of receipt text data extracted from image data in accordance with some embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "image data" or "receipt image data" refers to data defining an image of a receipt. The receipt may be generated in the course of a transaction with a merchant, such as by a point-of-sale (POS) device of the merchant. The image data may be generated by a camera or other optical image capture device, such as a camera of a mobile consumer device. The receipt may include "fields" or locations where text having predefined meanings (e.g., merchant name, transaction time, shop location, return deadline, and item data, etc.) may be extracted.

As used herein, the term "receipt text data" refers to machine data defining text that has been extracted from the image data using OCR. The receipt text data may include alphanumeric characters.

As used herein, the term "structured receipt data" refers to receipt text data that has been defined with respect to a receipt structure. A receipt structure may include receipt elements corresponding with "fields" of data on the receipt. For example, a receipt element may be defined for merchant name, transaction time, shop location, return deadline, and item data (e.g., with receipt elements including item code (e.g., stock keeping unit (SKU) number), item name, item cost, etc.). In some embodiments, different merchants may be associated with different receipt structures, each including receipt elements that are associated with locations where the corresponding fields are printed on the receipt.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 shows an example computing system within which embodiments of the present invention may operate. Consumers and merchants may access a receipt processing service from a receipt processing system 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing system 102 may comprise a server 104 and a database 106.

The server 104 may be embodied as a single computer or multiple computers. The server 104 may provide for receiving of receipt image data from various sources, including but not necessarily limited to the consumer devices 108A-108N and the merchant devices 110A-110N. For example, the server 104 may be operable to receive receipt image data from a consumer device 108, and process receipt image data. As discussed in greater detail herein, the server 104 may be configured to perform image cleanup (e.g., if the cleanup has not already been performed by the consumer deice 108), detect a logo of a merchant from the receipt to identify a merchant, and extract receipt text data, and then generate structured receipt data with the extracted receipt text data and a receipt structure associated with the merchant. The structured receipt data may then be used to facilitate commercial activities with merchants and consumers, such as by building consumer profiles/preferences for targeted advertising and/or tracking merchant inventory levels to improve merchant operations. Although a single server 104 is shown, system 102 may include one or more servers 104. In some embodiments, the one or more servers 104 may include receipt log detector 212 and receipt text extractor 214, as shown in FIG. 2. In some embodiments, server 104 may further include a receipt cleanup 210.

Returning to FIG. 1, database 106 may be embodied as a data storage device such as a Network Attached Storage (NAS) device or devices, or as a separate database server or servers. The database 106 includes information accessed and stored by the server 104 to facilitate the operations of the receipt processing system 102. For example, the database 106 may include, without limitation, image data, logo image data, training logo image data, receipt text data, structured receipt data, receipt structures, merchant item data, consumer profile data, user account credentials, analytic results, reports, transaction data, and/or the like.

The consumer devices 108A-108N may be any computing device as known in the art and operated by a consumer. Electronic data received by the server 104 from the consumer devices 108A-108N may be provided in various forms and via various methods. The consumer devices 108A-108N may include mobile devices, such as laptop computers, smartphones, netbooks, tablet computers, wearable devices (e.g., electronic watches, wrist bands, glasses, etc.), and the like. Such mobile devices may provide their receipt image data to the server 104 and receive targeted electronic marketing communications, rewards, incentives, etc. that are relevant to the sent data. As such, consumer device 108 may include a camera. In some embodiments, the consumer devices 108A-108N may include wired or stationary devices such as desktop computers or workstations.

In embodiments where a consumer device 108 is a mobile device, such as a smart phone or tablet, the consumer device 108 may execute an "app" or "consumer application" to interact with the receipt processing system 102, such as a receipt processing application. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the receipt processing system 102 via a web browser. As yet another example, the consumer device 108 may include various hardware or firmware designed to interface with the receipt system 102 (e.g., where the consumer device 108 is a purpose-built device offered for the primary purpose of communicating with the receipt processing system 102, such as a store kiosk).

The merchant devices 110A-110N may be any computing device as known in the art and operated by a merchant. For example, the merchant devices 110A-110N may include a merchant point-of-sale configured to facilitate transactions at the merchant shop and generate receipts including transaction data associated with the transactions.

FIG. 2 shows an example of a system 100 in accordance with some embodiments. In particular, FIG. 2 shows schematic block diagrams of functional modules of the system 100. Consumer device 108 may include a camera 202 and a receipt cleanup 210. The consumer device 108 and system 102 may be connected with each other via the network 112.

System 102 may include receipt logo detector 212 and receipt text extractor 214, which may be implemented via the one or more servers 104 and one or more databases 106 in some embodiments. In some embodiments, the server 102 may include the receipt cleanup module 210.

The receipt cleanup 210 may be configured to receive receipt image data of a receipt 204 captured by camera 202, and extract receipt text data from the image data. Subsequent to a cleanup, the receipt cleanup 210 may be configured to provide the image data to the receipt logo detector 212. The receipt logo detector 212 may be configured to detect a logo from the receipt image data, and then identify a merchant from the logo based on a comparison with training logo data. Subsequent to merchant identification, the receipt text extractor 214 may be configured to extract receipt text data from the image data, and generate structured receipt data on associating the receipt text data with receipt elements of a receipt structure associated with the merchant. In some embodiments, the receipt text extractor 214 may be further configured to determine format rules associated with the receipt elements, and update (e.g., correct) the structured receipt data based on the format rules. In some embodiments, a merchant device 110 may also include a camera and/or receipt cleanup 210. In that sense, the discussion herein with respect to providing receipt processing for consumer devices 108 may also be applicable for merchant devices 110.

Example Apparatus[es] For Implementing Various Embodiments

The server 104, database 106, consumer device 108 or merchant device 110 may be embodied by one or more computing systems or devices, such as apparatus 300 shown in FIG. 3. As illustrated in FIG. 3, the apparatus 300 may include a processor 302, a memory 304, an input/output circuitry 306, communications circuitry 308, a receipt cleanup circuitry 210, a receipt logo detector circuitry 212, and/or a receipt text extractor 214. The apparatus 300 may be configured to execute the operations described herein. Although these components are described with respect to functional limitations, it should be understood that the particular implementations necessarily include the use of particular hardware. It should also be understood that certain of these components may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 300 may provide or supplement the functionality of particular circuitry. For example, the processor 302 may provide processing functionality, the memory 304 may provide storage functionality, the communications circuitry 308 may provide network interface functionality, and the like.

In some embodiments, the processor 302 (and/or co-processor or any other processing circuitry assisting or otherwise associated with the processor) may be in communication with the memory 304 via a bus for passing information among components of the apparatus 300. The memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus to carry out various functions in accordance with example embodiments of the present invention.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display and may comprise a web user interface, a mobile application, a client device, a kiosk, or the like. Where the input/output circuitry 306 is part of a consumer device 108, the input/output circuitry may include a camera or other optical image capturing device. In some embodiments, the input/output circuitry 306 may also include a keyboard, a mouse, a joystick, soft keys, a microphone, motion sensor, touch screen, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

When circuitry 300 is implemented on a server 104, circuitry 300 may include the receipt logo detector circuitry 212 and receipt text extractor circuitry 214. When circuitry 300 is implemented on a consumer device 108, circuitry 300 may include the receipt cleanup circuitry 214.

Circuitries 210, 212, and 214 may utilize processing circuitry, such as the processor 302, to perform these actions. However, it should also be appreciated that, in some embodiments, circuitries 210, 212, and 214 may include a separate processor, specially configured field programmable gate array (FPGA), or application specific interface circuit (ASIC). Circuitries 210, 212, and 214 may therefore be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Receipt Processing

FIG. 4 shows a flow chart of an example of a method for receipt image cleanup in accordance with some embodiments. Method 400 may begin at 402 and proceed to 404, where one or more servers 104 (e.g., of the receipt processing system 102) may be configured to send a request for image data defining an image of a receipt to a consumer device 108.

The one or more may establish a network connection with a consumer device for transfer of the image data. For example, the connection may be established based on the consumer device 108 connecting with the one or more servers 104 of the receipt processing system 102 via network 112, as shown in FIG. 1.

In some embodiments, the network connection may be initiated based on consumer device access to a consumer application for providing a consumer interface installed and/or otherwise executing on the consumer device. In another example, the consumer device may access a webpage configured to provide the consumer application/interface, such as by entering a uniform resource locator (URL) within a web browser. The connection between the consumer device 108 and the one or more servers 104 may include a wireless connection such that the consumer device may maintain network connectivity while traveling to different locations. The consumer application may be installed on and/or otherwise executed by the processing circuitry of the consumer device, such as on a mobile device operating system as discussed above. Subsequent to the consumer accessing the consumer application or webpage, the server 104 may be configured to send the request for the image data.

At 406, the consumer device 108 may be configured to create the image data with a camera. FIG. 7 shows an example of image data 700 defining a receipt 702, in accordance with some embodiments. Receipt 702 has been captured in front of a background 704, and includes a receipt logo 706 and text 708. The image data 700 may be captured by the camera, which may be an integrated device of the consumer device 108, or may be otherwise provided to the consumer device 108, such as from a separate camera or other image capturing device. The image may be created based on the consumer pointing the camera to the physical receipt, and capturing an image of the receipt.

At 408, the consumer device 108 (e.g., the receipt cleanup 210) may be configured to perform image cleanup for logo identification. The logo identification may also include a receipt identification where the receipt is extracted from the background to facilitate the logo identification. In some embodiments, the one or more servers 104 may include the receipt cleanup 210. Here, the consumer device 108 may be configured to send the image data to the one or more servers 104 subsequent to creation by the camera, and without performing an image cleanup. However, performing the image cleanup on the consumer device 108 is advantageous for the technical problem of reducing central server processing load, such as when the server 104 is providing receipt processing concurrently to multiple consumer devices.

The image cleanup may include performing an algorithmic transformation of the pixels of the image based on setting one or more image parameters to predefined values. Example image parameters may include contrast, brightness, filter size, offset, smoothing strategy, enhancement strategy, rotations/skew, etc. Image cleanup may be performed to facilitate receipt identification from the background of the image, and/or to facilitate logo identification.

Filter size refers to the size of the image filter used to clean noise from the background of the image (in pixels). Offset refers to the spacing of the filter used to clean noise from the background. Smoothing threshold refers to the threshold of color difference between pixels for text smoothing. If pixels have colors within this difference threshold, they will be smoothed into the same color to make text more clear. Enhancement strategy enhances the contrast of the image to normalize the brightest and darkest pixels. Rotation/skew refers to the orientation of the image. Some other example image parameter adjustments may include increasing sharpness, adaptive blur, or background color.

FIG. 8 shows an example of image data 800 programmatically transformed for receipt detection and/or logo identification in accordance with some embodiments. The contrast of the image data 700 may be iteratively adjusted until the edges 804 of the transformed receipt 402 are identified within the image data 800. For a white receipt on a dark background, little iteration may be needed. However, in an example of the white receipt on a light background, more iterations of (e.g., increasing) contrast may be needed to identify the edges of the receipt. The receipt cleanup 210 may be configured to perform a pixel-by-pixel analysis of each adjusted image to identify a white and/or rectangular shape that is common to nearly all commercial receipts. However, other types of colors and shapes may be used as parameters for the pixel-by-pixel analysis as could be necessitated by merchant use.

In some embodiments, the receipt cleanup 210 may be configured to perform a predefined number (e.g., 30) iterations of contrast image parameter values in the event that the receipt edges (and/or a logo) are not identified, and send a request to the display of the consumer device 108 to capture a second image of the receipt if the receipt edges are not identified subsequent to the predefined number of iterations.

In some embodiments, the contrast of a digital image may represent the amount of differences between black and white in an image. The pixels of the image may define a data range and a display range. The data range is the range of intensity values used in the image (e.g., from 0 to 255), while the display range is the black-to-white mapping used to display the image (e.g., also mapped from 0 to 255). The contrast may represent the display range, with larger contrast representing a larger display range and lower contrast representing a lower display range. For example, a contrast of 255 may represent the highest display range value (between 0 and 255), where the color black is mapped to the darkest data range value in the image (e.g., 255 if the image includes black), and the rest of the image intensities are scaled accordingly until white is mapped to 0. In another example, a contrast of 150 would result in the intensity values above 150 (e.g., from 150 to 255) being transformed into pure black, and the rest of the image intensities scaled accordingly. In some embodiments, the lower display range may additionally or alternatively be adjusted to increase or decrease the contrast image parameter value.

When contrast values scale from 0 to 255, the iterative testing for receipt or logo detection may be scaled accordingly. For example, the contrast image parameter value may be set to 5, the image may be transformed, and receipt/logo detection may be performed. The contrast image parameter value may then be incremented by 8, such as for each successive image transformation, to result in 30 test iterations of contrast image parameter values between 0 and 255. It is appreciated that the display range of 0 and 255 is only an example, and the scaling could be adjusted (e.g., between 0 and 30, to provide a unitary step size per iteration).

The brightness image parameter value may also be iteratively tested for optimization. The brightness of an image pixel may represent the average of the RGB color values, or the lightness parameter of a cylindrical coordinate representation of RGB color values (e.g., HSL, HSV, HSB, etc.). In some embodiments, the brightness image parameter value may be defined from 0 to 1. Here, iterative tests may be performed, such as 30 iterative tests with uniform step sizes between 0 and 1. In some embodiments, the testing may be optimized by using image parameter value ranges in between the possible extremes, such as between 150 and 255 for the contrast image parameter value because the lowest contrasts may be expected to obscure some visual data.

Advantageously, the process of iterations and subsequent image capture may be performed on the consumer device 108, with only image data having successfully identified receipts and/or logos (e.g., based on color and/or shape definition) being sent to the server 104. As such, server processing load is reduced. Network congestion that may otherwise be caused by the transfer (and retransfer) of unusable images from the consumer device 108 to the server 104 via the network 114 is also reduced.

Subsequent to the identification of the edges of the receipt, the receipt cleanup 210 may be configured to perform deskew, resize, and/or dewarp of the image. For example, the receipt cleanup 210 may be configured to perform deskew of the receipt based on the identified edges. As such, a consistent orientation may be maintained for receipt images to facilitate pixel-by-pixel comparisons/analysis as discussed in greater detail herein. In some embodiments, deskew may be performed based on logo identification, such as by deskewing the image based on the deskew image parameter value that optimizes a logo match score.

Additionally or alternatively, the receipt cleanup 210 may be configured to perform a resize of the receipt based on the identified edges. For example, merchant receipts typically are printed on standard or consistently sized paper rolls, however, the size of the receipt on an image can vary such as based on camera distance when the image was taken. As such, a consistent size for the receipt may be maintained to facilitate the pixel-by-pixel comparisons/analysis.

Additionally or alternatively, the receipt cleanup 210 may be configured to perform dewarp of the receipt based on the identified edges. Dewarp refers to the virtual straightening of curvature, folds, and/or crumpling of the receipt paper to produce an image that likely more accurately represents the contents printed on the receipt than the distorted image of the receipt itself.

At 410, the one or more server 104 (e.g., the receipt logo detector 212) may be configured to attempt logo identification from the (e.g., cleaned up) image data based on training logo image data. As discussed in greater detail below with respect to method 500 and FIG. 5, the logo identification may be based on determining "logo match scores" between the logo on the receipt and training logos defined by the training logo image data. For example, the logo match score may indicate a level of matching for a transformed image logo 806 and a training logo, such as based on a pixel-by-pixel comparison.

In some embodiments, the image cleanup and logo detection may include an iterative process wherein different image parameters are adjusted until a logo is successfully detected. For example, the receipt cleanup 210 may be configured to utilize a genetic algorithm that iterates through different image parameter values, and determines logo match scores based on a pixel-by-pixel comparison of the logo as transformed by the different image parameter values and the training logos associated with merchants. The iteration may include generating transformed images using combinations of different image parameter values (e.g., contrast, brightness, filter size, offset, smoothing strategy, enhancement strategy, rotations/skew, etc.) that can be applied to transform the image, then comparing each transformed image logo to each of the training logos.

The combinations of image parameter values may serve as the population of candidate solution to the genetic algorithm to optimize the highest logo match score across the training logos. An initial population may be created based on random selections of image parameter value combinations, based on a prior best solution as determined by the genetic algorithm (e.g., for a prior receipt or image captured by the camera), predefined image parameter values, or the image parameter values that optimized receipt detection as discussed above at 408. The more "fit" initial combinations of image parameter values may be selected (e.g., stochastically), and modified (e.g., such as by random change of an image parameter value and/or a crossover of image parameter values) to create the next generation, and so forth iteratively until an optimal solution is achieved for the image parameter values. The genetic algorithm may be performed for multiple test images (e.g., a seed of 100) of receipts, and the most optimized image parameter values across the test images may be determined, and used for subsequent image clean up.

In some embodiments, the iteratively determined image parameter values resulting in the highest logo match scores may be used as predefined image parameter values, such as for a subsequent image cleanup for logo and/or receipt identification. Advantageously, the iterative image parameter value optimization may be performed based on one or more receipts captured by the camera of the consumer device 108, and thus provides a technical solution to the technical problem of varying image quality and characteristics (e.g., based on different camera designs, models, manufacturers, etc., or user variance such as picture taking distance, angle, etc.).

As discussed in greater detail below, image cleanup can also be performed for text extraction.

At 412, the one or more servers 104 (e.g., the receipt log detector 212) may be configured to determine whether a logo was identified. For example, the logo match scores may be compared with a predefined logo match score threshold (e.g., 77%), and a logo may be identified as matching a training logo of a merchant based on the associated logo match score between the logo and the training logo exceeding the logo match score threshold. In some embodiments, one or more image cleanups may be performed subsequent to the logo detection, such as size, deskew, or dewarp transformations.

In response to determining that the logo failed to be identified, method 400 may return to 404, where the one or more servers 104 may be further configured to send a subsequent request for image data defining an image of the receipt to the consumer device 108. As such, in some embodiments, steps 402-410 may be repeated (e.g., as deemed appropriate by the consumer operating the consumer device 108) until a logo of a merchant has been identified.

Returning to 412, in response to determining that merchant logo has been identified, method 400 may proceed to 414, where the one or more servers (e.g., the receipt log detector 212) may be configured to associate the receipt with the merchant. In some embodiments, the association may be based on the logo image and the name of the merchant, or an identifier of the merchant. As discussed in greater detail below with respect to method 600 and FIG. 6, each merchant may be further associated with a receipt structure including receipt elements defined by the fields of the receipt of the merchant. Different merchants may be associated with different receipt structures, each including receipt elements that are associated with different physical locations of receipts of the different merchants where the corresponding fields are printed. Advantageously, the use of the receipt structure may provide for improved accuracy in text extraction by leveraging predefined expectations, or "format rules" associated with the receipt elements.

At 416, the one or more servers 104 (e.g., the receipt cleanup 210) may be configured to perform image cleanup for text extraction. The image cleanup techniques discussed at 408 may be applicable at 418. For example, the receipt cleanup 210 may be configured to perform an algorithmic transformation of the pixels of the image based on setting one or more image parameters to predefined values. The predefined image parameter values may be different from the image parameter values used in the image cleanup for logo/receipt identification. Alternatively, a single set of predefined values may be used for both logo identification and text extraction. Here, a single image cleanup step may be performed, such as at 408.

FIG. 9 shows an example of image data 900 programmatically transformed for text extraction in accordance with some embodiments. The image data 900 may include receipt 902 including logo 904 and text 906. The image data 900 represents a receipt image subsequent to transformation based on image parameters optimized for text extraction. For example, to facilitate point-by-point comparisons, the receipt image data has been rotated, contrast and brightness increased, orientation of the receipt has been deskewed, and the background has been cropped out.

In some embodiments, determination of image parameter values for text extraction may include determining "text match scores" for combinations of image parameter values. The accuracy of text extraction may be determined based on the text match scores, defining an amount of match between extracted OCR text of a (e.g., training) receipt image data and known keywords of the receipt. For example, the text match score may be defined as a percent, with 100% being the highest score and meaning that all corresponding characters of extracted text from the receipt image data and the characters of the keywords matched, and 0% being the lowest score and meaning that no corresponding characters of the extracted text and keywords matched.

In some embodiments, the receipt cleanup 210 may be configured to utilize a genetic algorithm that uses a training receipt including known keywords. Here, image parameter values are optimized to improve accuracy of text extraction. The genetic algorithm may include iterating through different image parameter values, and determining text match scores based on a comparison of extracted text (e.g., receipt text data or structured receipt data) with the known keywords of the receipt. The iteration may include generating transformed images using combinations of different image parameter values (e.g., contrast, brightness, etc.) that can be applied to transform the image, then the extracted receipt text with the known keywords of the receipt. In some embodiments, known keywords may be selected based on words that are expected to be found on receipts such as "tax", "TOTAL", or "SUBTOTAL." In some embodiments, a predefined number of image parameters (e.g., 5) may be used, such as contrast, brightness, filter size, offset, smoothing strategy, enhancement strategy, rotations/skew, etc.

The combinations of image parameter values may serve as the population of candidate solution to the genetic algorithm to optimize the highest text match score. An initial population may be created based on random selections of image parameter value combinations, based on a prior best solution as determined by the genetic algorithm (e.g., for a prior receipt or image captured by the camera), predefined image parameter values, or the image parameter values that optimized receipt detection or logo identification. The more "fit" initial combinations of image parameter values may be selected, and modified (e.g., such as by random change of an image parameter value and/or a crossover of image parameter values) to create the next generation, and so forth iteratively until an optimal solution is achieved for the image parameter values.

In some embodiments, the iteratively determined image parameter values resulting in the highest text match scores may be used as predefined image parameter values, such as for a subsequent image cleanup for text extraction. In some embodiments, the optimized image parameters for text extraction may be used as predefined values for the image parameters in a single image cleanup step (e.g., at 408). In some embodiments, a single genetic algorithm-based image cleanup may be performed, such as to determine image parameters that optimize logo detection (e.g., based on logo match scores) and text extraction (e.g., based on text match scores). Accordingly, the receipt image data may be transformed based on the optimized or predefined image parameters values.

At 418, the one or more servers 104 (e.g., the receipt text extractor 214) may be configured to attempt text extraction based on a receipt structure associated with the merchant. The text extraction may be performed using OCR. As discussed in greater detail below in connection with method 600 and FIG. 6, the identified merchant (e.g., based on logo identification) may be associated with a receipt structure including receipt elements. Furthermore, the receipt text extractor 214 may be configured to associate extracted receipt text data with the receipt elements of the receipt structure to facilitate the text extraction.

At 420, the one or more servers 104 (e.g., the receipt text extractor 214) may be configured to determine whether the text extraction is successful. A successful text extraction may result in the creation of receipt text data via OCR. In contrast, an unsuccessful text extraction may result in a lack of usable receipt text data (e.g., no text extracted).

In some embodiments, the determination as to whether a text extraction was successful may include a comparison of a text match score between the receipt text data and known keywords associated with the receipt structure, and a text match score threshold. The text match score threshold may define the text match score needed (e.g., 70%) between the receipt text data and the known keywords of the receipt (e.g., "tax," "TOTAL," or "SUBTOTAL," etc.). In some embodiments, the text match score threshold may be set to allow for different levels of tolerance for different merchant receipts. For example, some receipts may use fonts that are more susceptible to OCR character differentiation, while other receipts may use fonts with very similar, but different characters (e.g., the number 0 and the letter O). Thus each merchant or receipt structure may also be associated with a text match score threshold.

In some embodiments, the determination of a text match score threshold of a merchant's receipts may use a manual process to develop a training set. Through (e.g., online) crowd source labor or employees, the system may show receipt images alongside extracted structured receipt data, and request manual verification of key data points (e.g., compare with keywords). The manual response indicates the accuracy of the OCR, and may be used to set the text match score threshold. In another example, the text match score threshold may be determined programmatically, such as to set a predetermined percentage (e.g., 80%) of text match scores for a sample of test images as being successfully extracted.

In response to determining that the text extraction fails to be successful, method 400 may return to 404, where the one or more servers 104 may be further configured to send a subsequent request for image data defining an image of the receipt to the consumer device 108. As such, repeated attempts at image clean up and text extraction may be performed for new receipt image data, such as until receipt text data has been successfully extracted.

Returning to 420, in response to determining that merchant logo has been identified, method 400 may proceed to 422, where the one or more servers (e.g., the receipt text extractor 214) may be configured to generate structured receipt data based on the receipt text data. The structured receipt data may include the extracted receipt text data categorized based on the field or subject matter of the text. As such, fine receipt data including the details of individual items (e.g., name, SKU, price, quantity, etc.) may be programmatically extracted from the image data of the receipt. Additional details with respect to generating and updating structured receipt data are discussed below in connection with method 600 and FIG. 6. Method 400 may then proceed to 424 and end.

FIG. 5 shows an example of a method 500 for receipt logo detection in accordance with some embodiments. Method 500 may begin at 502 and proceed to 504, where the one or more servers 104 (e.g., the receipt log detector 212) may be configured to identify a log of a receipt based on image data defining an image of the receipt.

The image data may be created with a camera of a consumer device 108, as discussed at 404, and may have been further processed using an image cleanup, such as discussed at 408 and/or 416 of method 400. Through the image cleanup, a transformed receipt image that is optimized for logo identification may be created and used for the logo identification, such as image data 800 shown in FIG. 8. In some embodiments, method 500 may be performed as part of an iterative and/or genetic algorithm for generating optimized image parameters using determinations of logo match scores.

In some embodiments, subsequent to image cleanup, identification of the logo or region where the logo is located within the receipt image data may be performed based on applying a color and/or shape definition to a search 5 of the pixels of the receipt image. For example, the image data 800 may be analyzed to locate a cluster of (e.g., black) colored pixels that represents the logo 806. Subsequent to identifying the logo 806 on the receipt 802, the pixels associated with the logo 806 may be used for merchant identification.

At 506, the one or more servers 104 (e.g., the receipt logo detector 212) may be configured to determine training logo image data defining training logos associated with a merchant. The receipt processing system 102 may include the database 106 configured to store training logo images associated with merchants. The training logo data associations with merchants may be predefined, for example, by a human operator that creates the training logo images from receipts of the merchants. For each unique merchant one or more training logos may be stored and accessed to perform merchant detection based on the logo identification. In some embodiments, captured training logo image data may also be processed using image cleaning techniques prior to being stored and used as logo identification training data examples.

At 508, the one or more servers 104 (e.g., the receipt logo detector 212) may be configured to determine logo match scores between the logo of the receipt and a training logo associated with the merchant. A logo match score may indicate a level of matching for a transformed (e.g., via image clean up) image logo and the training logo of the merchant, such as based on a pixel-by-pixel comparison. In some embodiments, the logo match score may be defined as a percent, with 100% being the highest score and meaning that all corresponding pixels (e.g., based on X, Y pixel coordinates) of the transformed image logo and the training logo matched, and 0% being the lowest score and meaning that no corresponding pixels of the two logos matched. Thus, the logo match score may be generated based on a pixel-by-pixel comparison of the logo, as transformed by the image parameter values, with the training logos associated with merchants.

At 510, the one or more servers 104 (e.g., the receipt logo detector 212) may be configured to determine a logo match score threshold. The logo match score threshold may define whether a logo match score between the receipt image logo and the training logo indicates a match between the receipt image logo and the training logo, and thus also a match for the merchant associated with the training logo. A higher logo match score threshold nay be used to impose greater image data similarity requirement for determining a successful match, while a lower logo match score threshold may be used to impose a lower image data similarity requirement.

At 512, the one or more servers 104 (e.g., the receipt logo detector 212) may be configured to determine whether the logo match score satisfies the logo match score threshold. For example, the logo match scores may be compared with a predefined logo match score threshold (e.g., 77%), and a logo may be identified as matching the training logo of the merchant based on the associated logo match score between the logo and the training logo exceeding the logo match score threshold.

In response to determining that the logo match score fails to satisfy the logo match score threshold, method 500 may return to 508, where the one or more servers 104 may be configured to determine a logo match score between the logo of the receipt and a second training logo associated with the merchant. The second training logo may be one of a plurality of training logos associated with the merchant. In some embodiments, steps 508-512 may be repeated for each of the training logos associated with the merchant.

In some embodiments, when each of the training logos associated with the merchant has been tests (e.g., and no match was found) at 512, method 500 may return to 506, where the one or more servers 104 may be configured to determine training logo image data defining one or more training logos associated with a second merchant. Until a logo match is found, logo match scores may be determined for each training logo (e.g., across all merchants). In some embodiments, the one or more servers 104 may be configured to iterate through each of the training logos across all merchants to perform comparison of training logos.

In some embodiments, when multiple training logos exceed the logo match score threshold, the logo may be identified as matching the training logo associated with the highest logo match score. In another example, when no logo match score exceeds the logo match score threshold, the one or more servers 104 may be configured to determine that the logo failed to be identified, or alternatively, select the highest logo match score.

Returning to 512, in response to determining that the logo match score of a training logo associated with a merchant satisfies the logo match score threshold, method 500 may proceed to 514, where the one or more servers 104 (e.g., the receipt logo detector 212) may be configured to determine the merchant associated the training logo as being associated with the receipt. As such, the identity of the merchant may be determined based on a programmatic visual analysis of the receipt.

At 516, the one or more servers 104 (e.g., the receipt logo detector 212) may be configured to add the image of the logo to the training logo image data associated with the merchant as a new training logo. Thus, the new training logo can be a dynamic addition to the initial pool of representative training logos of the merchant (e.g., as created by a manual operator).

At 518, the one or more servers 104 (e.g., the receipt logo detector 212) may be configured to update the logo match score threshold based on number of training logos associated with the merchant. Advantageously, a greater number of training logos associated with a single merchant allows for improved accuracy and precision for logo identification based on pixel-by-pixel comparisons. As such, the logo match score threshold may be larger when a merchant has a larger number of training logos, and smaller when the merchant has a smaller number of training logos. When a new training logo is added, the logo match score threshold may be increased. The updated logo match score threshold of the merchant may then be used for subsequent logo identifications as discussed above at 512.

Some embodiments may use different thresholds for logo identification than training logo addition. For example, a higher threshold may be set for training logo addition than logo identification, such that only closer matching receipt images become part of the training logos of the merchant. In another example, a single threshold may be used such that more receipt images are added to the training logos, such as to dynamically build a larger collection of representative examples that can improve the accuracy of logo identification. Method 500 may then proceed to 520 and end.

FIG. 6 shows an example of a method 600 for receipt text extraction in accordance with some embodiments. Method 600 may begin at 602 and proceed to 604, where one or more servers 104 (e.g., the receipt logo detector 212) may be configured to determine a merchant as being associated with a receipt based on logo detection. The discussions at 414 and 514 of methods 400 and 500 discussed above may be applicable at 602. Furthermore, the one or more servers 104 may be configured to perform and image cleanup, as discussed at 408 and 416 of method 400. As such, the receipt image may be in a form that is optimized for text extraction, such as image data 900 shown in FIG. 9. Additionally or alternatively, determination of the merchant may be based on other techniques, such as consumer device input by the consumer, or consumer device location detection (e.g., consumer is at a known merchant location).

At 606, the one or more servers 104 (e.g., the receipt text extractor 214) may be configured to determine a receipt structure associated with the merchant. The receipt structure may define receipt elements corresponding with "fields" of data on the physical receipt. Each receipt element may also be associated with a location (e.g., X, Y coordinate) that corresponds with the location of the corresponding field on the physical receipt. For example, a receipt element may be defined for merchant name, transaction time, shop location, return deadline, and item data (e.g., with receipt elements including item code (e.g., stock keeping unit (SKU) number), item name, item cost, etc.).

FIG. 10 shows an example of a receipt structure 1000 in accordance with some embodiments. The receipt structure 1000 is show as an overlay on the receipt 902 to illustrate the associated receipt locations (e.g., X-Y coordinate) for each receipt element. Example receipt elements may include transaction receipt elements, category receipt elements, and item receipt elements. The transaction receipt elements refer to receipt elements defining data about the transaction of the receipt, such as store location receipt element 1002, store contact info receipt element 1020, transaction date receipt element 1004, and transaction time receipt element 1006. The category receipt elements, when used by a receipt, refers to receipt elements that define item categories such as entertainment-electronics receipt element 1008, grocery receipt element 1010, and miscellaneous receipt element 1012.

The item receipt elements define individual items that were purchased, such as item receipt elements 1014 (e.g., US Weekly magazine) and 1016 (e.g., broccoli). Receipt elements may also include sub-elements. For example, item receipt element 1016 may further include a SKU/identifier receipt element (e.g., 21140319), an item type receipt element (e.g., BROCCOLI), an item brand receipt element (e.g., BROCCOLI FLORETS), a unit size receipt element (e.g., 12 OZ), a unit count receipt element (e.g., 2@), a per unit price receipt element (e.g., $2.94), and a total item price receipt element (e.g., $5.88).

In some embodiments, different merchants may be associated with different receipt structures, each including receipt elements and associated locations where the corresponding fields are printed. The receipt structures may be stored by the receipt processing system 102 and accessed for parsing extracted text, such as within database 106. Thus, the visual logo identification and merchant determination can be used to identify the appropriate receipt structure.

At 608, the one or more servers 104 (e.g., the receipt text extractor 214) may be configured to perform text extraction of the receipt to generate receipt text data. The receipt text data may refer to machine data defining text that has been extracted from the image data of the receipt using machine optical text extraction techniques, such as OCR. The receipt text extractor 214 may be configured to perform a line-by-line extraction of the text to generate the receipt text data, or a receipt element-by-recent element extraction of the text. FIG. 11 shows an example of receipt text data 1100 extracted from the text 906 of the image data 900 using a line-by-line extraction, in accordance with some embodiments.

At 610, the one or more servers 104 (e.g., the receipt text extractor 214) may be configured to associate the receipt text data with the receipt elements of the receipt structure to create structured receipt data. For example, the locations on the receipt 900 from where the receipt text data 1100 is extracted may be compared with the predefined locations of the receipt elements as shown in FIG. 10. For corresponding locations, the receipt text data may associated with the corresponding receipt element of the receipt structure. As such, structured receipt data including receipt text data that has been defined with respect to a receipt structure is created.

In some embodiments, the receipt structure and structured receipt data may be represented using a receipt structure language. The receipt structure language may be implemented using the Extensible Markup Language. For an example including the broccoli item, structured receipt data may be defined using the receipt structure language as shown below:

```
<receipt>
    <transaction>
        <store>CHICAGO DIVISION</store>
        <phone>312-460-8944</phone>
        <date>07/16/2015</date>
        <time>05:58 PM</time>
    </transaction>
    <items>
        <category>GROCERY</category>
        <item>
            <SKU>21140319</SKU>
            <type>BROCCOLI</type>
            <brand>BROCCOLI FLORETS</brand>
            <unitsize>12 OZ</unitsiz>
            <unitcount>2@</unitcount>
            <unitprice>$2.94</unitprice>
            <price>$5.88</price>
        </item>
    </items>
</receipt>
```

Although only a single item of the receipt is shown, each of the items listed on the receipt may be associated with an <item></item> element of the receipt structure language. At 612, the one or more servers 104 (e.g., the receipt text extractor 214) may be configured to determine a format rule associated with a receipt element of the receipt structure. At 614, the one or more servers 104 (e.g., the receipt text extractor 214) may be configured to update the structured receipt data associated with the receipt element based on the format rule if the structured receipt data violates the format rule.

A receipt element may be associated with format rules for the text data of the receipt element. For example, a price receipt element may include a format rule specifying that the characters must be a number (e.g., the number 0 instead of the letter o), and/or begin with either a $ (e.g., rather than the letter "S") or a number (e.g., if the receipt does not use $). As such, if an OCR error results in an alphabet character being included within the price receipt element, the error may be identified and corrected based on the format rules.

Advantageously, the use of structured receipt data including receipt elements with format rules provides for improved OCR error correction by "simplifying" the problem of machine identification of similar, but different, characters. For example, OCR techniques often have difficulty differentiating the character $ and the letter s, or the letter b and the number 6, etc. This may be particularly difficult in the context of receipt OCR because receipts are typically not designed to facilitate OCR reading (e.g., unlike checks), such as by using non-standard fonts rather than OCR fonts. The receipt text extractor 214 may be configured to apply format rules to or each unit of structured receipt data associated with receipt elements, and updating as appropriate.

In some embodiments, receipt structures may be programmatically discovered based on OCR. As such, the determination of the receipt structure at 606 is not necessarily limited to manual operator definition. For example, applying OCR to image data of the merchant as discussed herein, the receipt text extractor 214 may be further configured to detect receipt elements and their associated (e.g., XY coordinate) locations on the receipt. The receipt elements may be discovered based on applying the format rules of the receipt elements to the extracted receipt text data. For example, price receipt element may be discovered based on detecting a "$" followed by a numerical value. An item receipt element may be identified based on a sequence of numbers representing the SKU. And so forth. In another example, predefined receipt element values may be used, such as category names to discover the category receipt elements, known store locations to discover the location receipt element, item names/SKUs to discover item receipt elements, etc. Method 600 may then proceed to 616 and end.

CONCLUSION

Many modifications and other embodiments will come to mind to one skilled in the art to which these embodiments pertain having the benefit of the teachings presented in the foregoing descriptions and the associated drawings. For example, while the image cleanup, logo identification, and text extraction techniques are discussed herein with respect to an image of a receipt, they may be extended to other types of degraded documents. Degradation may refer to image quality, such as may be caused by variances in camera quality, camera placement (e.g., distance, gaze angle), lighting, image skew, document quality for OCR (e.g., folding, crumpling, non-optimal fonts, etc.). Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A system, comprising:
   one or more servers configured to:
   receive a first transformed image of a receipt from a consumer device, wherein the first transformed image is created by programmatically transforming image data captured by a camera using first image parameter values optimized for logo detection;
   determine a training logo associated with a merchant;
   perform a logo identification based on determining whether the first transformed image includes a logo corresponding with the training logo;
   subsequent to determining that the first transformed image includes a logo that corresponds with the training logo associated with the merchant:
   determine second image parameter values optimized for text extraction;
   create a second transformed image by programmatically transforming the image data using the second image parameter values; and
   perform a text extraction using the second transformed image to create receipt text data.

2. The system of claim 1, wherein the one or more servers are further configured to determine the second image parameter values optimized for the text extraction based on the one or more servers being configured to:
   generate test images of a second receipt using different combinations of image parameter values;
   determine keywords of the second receipt;
   determine text extraction scores based on comparisons of extracted text from the test images with the keywords; and
   determine the second image parameter values based on the text extraction scores.

3. The system of claim 1, wherein the one or more servers are further configured to:
   determine whether the receipt text data has been successfully created based on the text extraction; and
   in response to determining that the receipt text data fails to be successfully created based on the text extraction, send a request for a third transformed image of the receipt to the consumer device, wherein the third transformed image is created by programmatically transforming second image data captured by the camera.

4. The system of claim 1 further comprising:
   the consumer device configured to:
   create the first transformed image by programmatically transforming the image data using the first image parameter values; and
   send the first transformed image to the one or more servers.

5. The system of claim 1, wherein the one or more servers are further configured to determine the first image parameter values optimized for logo detection based on being configured to:
   generate test images of a second receipt using different combinations of image parameter values;
   determine keywords of the second receipt;
   determine text extraction scores based on comparisons of extracted text from the test images with the keywords; and
   determine the second image parameter values based on the text extraction scores.

6. The system of claim 1, wherein the one or more servers are further configured to, in response to determining that the first transformed image fails to include a logo corresponding with the training logo, send a request for a third transformed image of the receipt to the consumer device, wherein the third transformed image is created by programmatically transforming second image data captured by the camera.

7. The system of claim 1, wherein the one or more servers configured to perform the logo identification includes the one or more servers being configured to perform a point-by-point comparison of the first transformed image with the training logo.

8. The system of claim 1, wherein the one or more servers are further configured to provide the first image parameter values to the consumer devices prior to receiving the first transformed image from the consumer device.

9. A method comprising:
receiving a first transformed image of a receipt from a consumer device, wherein the first transformed image is created by programmatically transforming image data captured by a camera using first image parameter values optimized for logo detection;
determining a training logo associated with a merchant;
performing a logo identification based on determining whether the first transformed image includes a logo corresponding with the training logo;
subsequent to determining that the first transformed image includes a logo that corresponds with the training logo associated with the merchant:
determining second image parameter values optimized for text extraction;
creating a second transformed image by programmatically transforming the image data using the second image parameter values; and
performing a text extraction using the second transformed image to create receipt text data.

10. The method of claim 9, wherein determining the second image parameter values optimized for the text extraction comprises:
generating test images of a second receipt using different combinations of image parameter values;
determining keywords of the second receipt;
determining text extraction scores based on comparisons of extracted text from the test images with the keywords; and
determining the second image parameter values based on the text extraction scores.

11. The method of claim 9, further comprising:
determining whether the receipt text data has been successfully created based on the text extraction; and
in response to determining that the receipt text data fails to be successfully created based on the text extraction, sending a request for a third transformed image of the receipt to the consumer device, wherein the third transformed image is created by programmatically transforming second image data captured by the camera.

12. The method of claim 9, wherein the consumer device is configured to:
create the first transformed image by programmatically transforming the image data using the first image parameter values; and
send the first transformed image to the one or more servers.

13. The method of claim 9, wherein determining the first image parameter values optimized for logo detection comprises:
generating test images of a second receipt using different combinations of image parameter values;
determining keywords of the second receipt;
determining text extraction scores based on comparisons of extracted text from the test images with the keywords; and
determining the second image parameter values based on the text extraction scores.

14. The method of claim 9, further comprising in response to determining that the first transformed image fails to include a logo corresponding with the training logo, sending a request for a third transformed image of the receipt to the consumer device, wherein the third transformed image is created by programmatically transforming second image data captured by the camera.

15. The method of claim 9, further comprising providing the first image parameter values to the consumer devices prior to receiving the first transformed image from the consumer device.

16. A computer program product comprising at least one non-transitory computer-readable storage medium having computer-executable program code instruction stored therein, the computer-executable program code instructions comprising program code instructions configured to:
receive a first transformed image of a receipt from a consumer device, wherein the first transformed image is created by programmatically transforming image data captured by a camera using first image parameter values optimized for logo detection;
determine a training logo associated with a merchant;
perform a logo identification based on determining whether the first transformed image includes a logo corresponding with the training logo;
subsequent to determining that the first transformed image includes a logo that corresponds with the training logo associated with the merchant:
determine second image parameter values optimized for text extraction;
create a second transformed image by programmatically transforming the image data using the second image parameter values; and
perform a text extraction using the second transformed image to create receipt text data.

17. The computer program product of claim 16, wherein determining the second image parameter values optimized for the text extraction comprises:
generating test images of a second receipt using different combinations of image parameter values;
determining keywords of the second receipt;
determining text extraction scores based on comparisons of extracted text from the test images with the keywords; and
determining the second image parameter values based on the text extraction scores.

18. The computer program product of claim 16, wherein the computer-executable program code instructions comprising program code instructions further configured to:
determine whether the receipt text data has been successfully created based on the text extraction; and
in response to determining that the receipt text data fails to be successfully created based on the text extraction, send a request for a third transformed image of the receipt to the consumer device, wherein the third transformed image is created by programmatically transforming second image data captured by the camera.

19. The computer program product of claim 16, wherein the consumer device is configured to:
create the first transformed image by programmatically transforming the image data using the first image parameter values; and
send the first transformed image to the one or more servers.

20. The computer program product of claim 16, wherein determining the first image parameter values optimized for logo detection comprises:
generating test images of a second receipt using different combinations of image parameter values;
determining keywords of the second receipt;

determining text extraction scores based on comparisons of extracted text from the test images with the keywords; and determining the second image parameter values based on the text extraction scores.

\* \* \* \* \*